March 11, 1924. 1,486,512
B. W. BOON
PLANT SETTING MACHINE
Filed Dec. 15, 1921 2 Sheets-Sheet 2
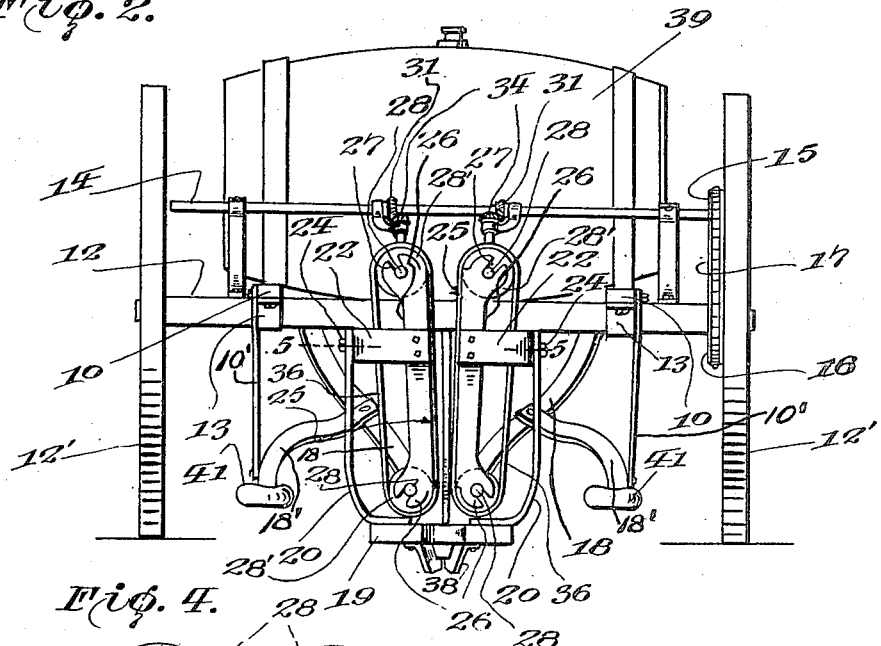
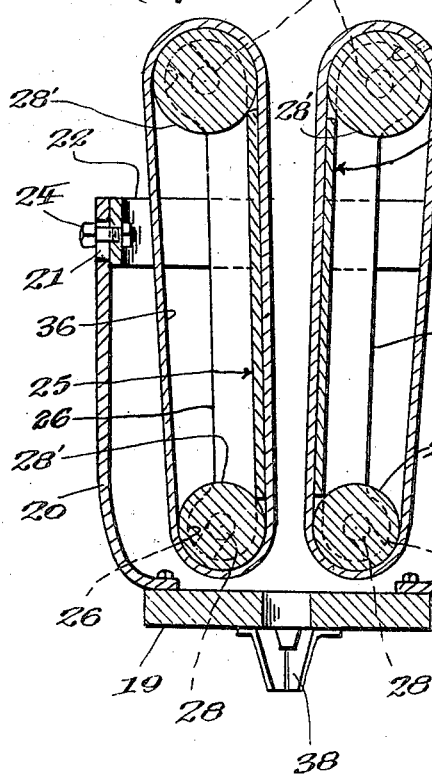
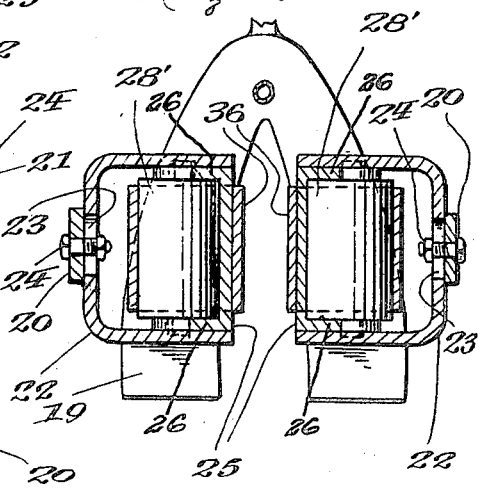
Inventor
Bud W. Boon
Attorneys Patented Mar. 11, 1924.

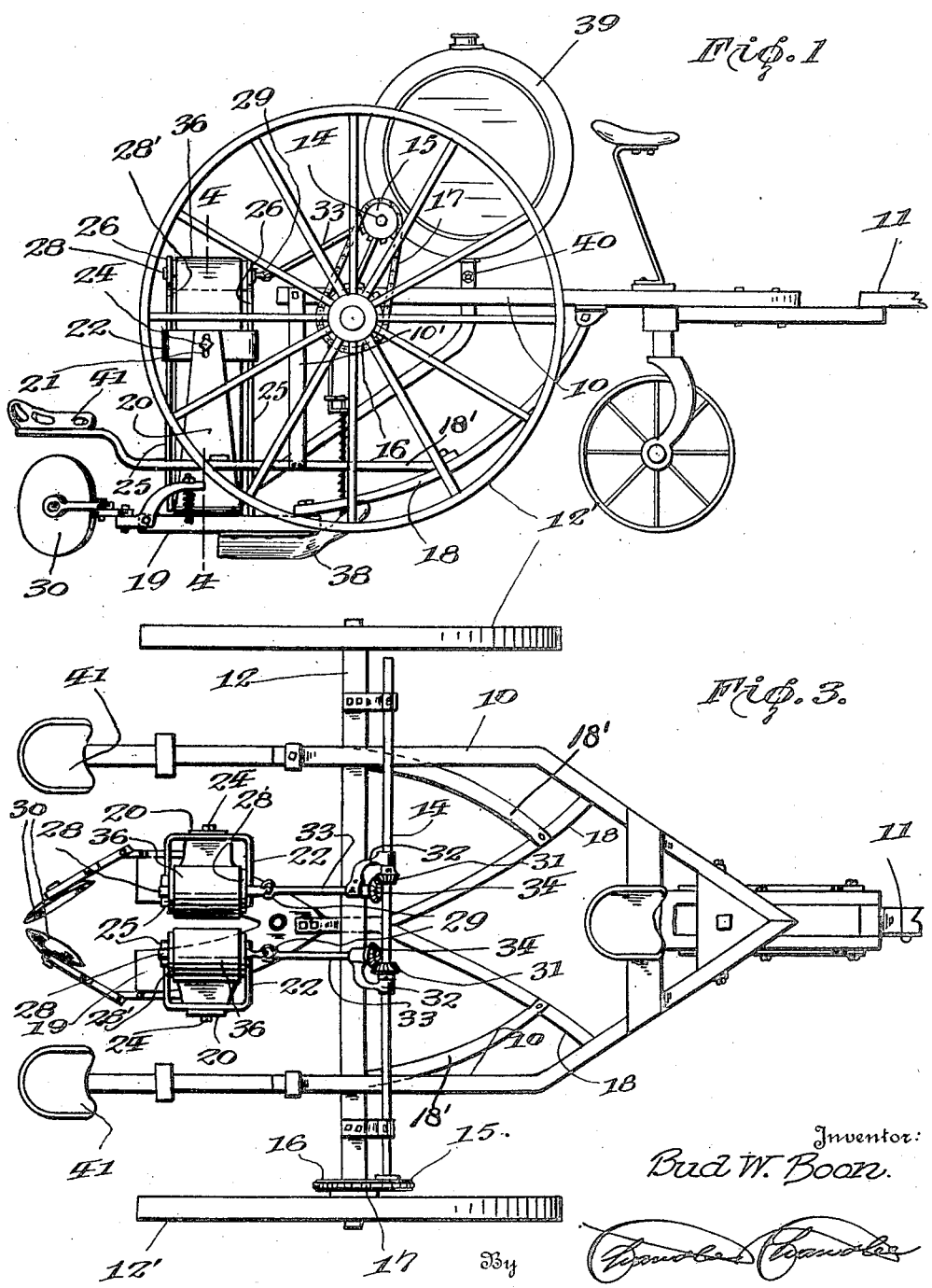

1,486,512

UNITED STATES PATENT OFFICE.

BUD W. BOON, OF DARDANELLE, ARKANSAS.

PLANT-SETTING MACHINE.

Application filed December 15, 1921. Serial No. 522,563.

*To all whom it may concern:*

Be it known that I, BUD W. BOON, a citizen of the United States, residing at Dardanelle, in the county of Yell, State of Arkansas, have invented certain new and useful Improvements in Plant-Setting Machines; and I do hereby declare the following to be a full, clear, and exact description of the invention, such as will enable others skilled in the art to which it appertains to make and use the same.

This invention relates to new and useful improvements in planting machines and particularly to machines for setting young plants, in rows, and at regularly spaced intervals.

One object of the invention is to provide a novel and improved machine by means of which young plants can be set at regularly spaced intervals, and in properly spaced rows, Another object is to provide an improved machine which forms a furrow, sets the plants in the furrow, covers them by forming hills or ridges of soil therearound, and which discharges water on the plants and soil around the plants.

Other objects and advantages will be apparent from the following description when taken in connection with the accompanying drawings.

In the drawings:

Figure 1 is a side elevation of a planting machine made in accordance with the invention.

Figure 2 is a rear elevation of the same.

Figure 3 is a top plan view of the machine.

Figure 4 is an enlarged vertical sectional view taken through the plant setting means, on the line 4—4 of Figure 1.

Figure 5 is an enlarged horizontal sectional view through the same parts as shown in Figure 4, taken on the line 5—5 of Figure 2.

Referring particularly to the accompanying drawings, there is shown a frame including the longitudinal parallel side bars 10, the forward ends of which converge and are attached to the draft pole or tongue 11. Extending transversely of the frame, at a point approximately midway of the length thereof, is the axle 12, the ends of said axle being provided with the ground wheels 12′, and the axle being secured to the frame by the clips 13. Mounted on the frame, forwardly of the axle, and disposed in parallel relation thereto, is a shaft 14, one end of said shaft having a sprocket wheel 15 secured thereon. One of the ground wheels 12′, is provided with a sprocket wheel 16, and around this sprocket 16 and the sprocket 15 is engaged a drive chain 17, whereby the shaft 14 receives motion, as the machine is drawn.

Extending downwardly and rearwardly from the frame, in convergent relation to each other, are bars 18, and secured to the convergent ends of these bars is a horizontal yoke 19. Secured to the upper face of this yoke 19 are the upwardly extending spring arms 20, the outer ends of which are longitudinally slotted, as shown at 21. To the outer end of each of the spring arms 20 is attached a bowed spring member 22, the bight portion of which is horizontally slotted, at 23, and through the slots of the arms 20 and of the springs 22, are disposed the securing bolts 24. By means of these bolts 24, and the slots of the springs and arms, the bowed springs may be adjusted vertically and forwardly and rearwardly, as will be clearly understood from the inspection of the drawings.

Disposed in vertical parallel planes, between the inner ends of the bowed springs 22, are the vertical plates 25, the front and rear edges of which are formed with the longitudinal parallel flanges 26, to the intermediate portions of which are secured the ends of the arms of said bowed springs. The upper and lower ends of the flanges 26 are formed with bearings 27, and rotatably supported in these bearings, and disposed horizontally, are the shafts 28, which have the rollers 28′, rotatably supported thereon. The upper ends of the forward shafts 28 are provided with universal joints 29.

Adjustably carried by the ends of the legs of the yoke 19, are the covering disks 30. On the intermediate portion of the shaft 14 are mounted the bevel gears 31. Supported in the brackets 32, carried by the main frame, and extending downwardly and rearwardly, are the drive shafts 33, the upper ends of said shafts being provided with the bevel gears 34, which mesh with the gears 31, while the lower ends of the shafts are connected with the before mentioned universal joints 29. Thus motion is transmitted from the shaft 14 to the shafts 28, to drive the latter. Engaged around the rollers 28', with their inner laps riding against the inner vertical faces of the plates 25, are the belts 36, these belts being set in motion by the rotation of the shafts 28.

Secured to the lower face of the yoke 19 are the rearwardly diverging furrow opening blades 38.

The plants to be set out are placed between the upper portions of the inner laps of the belts 36, by which they are firmly gripped and held in an upright position, with their roots disposed downwardly.

As the inner laps of the belts move downwardly the plants are carried therewith and maintained in their upright position until set in the furrow, which has been opened by the shovels 38, and the covering disks 30 have thrown the soil upwardly therearound to hold them, at which time the plants are released from the lower ends of the belts.

The spring arms 20 hold the plates 25 and the belts 36 pressed inwardly toward each other to grip the plants and hold them in proper upright position until the soil has been hilled or ridged sufficiently to maintain the plants in the furrows.

On the frame is mounted a receptacle 39, which contains water, said receptacle being provided with a valve controlled outlet 40, which is adapted to be manipulated to discharge water into the furrow, on the soil, around the plants, and on the plants, as the machine proceeds.

Secured to the bars 18, and extending rearwardly therefrom, are the arms 18', on the rear ends of which are mounted the seats 41, for the persons who place the plants between the belts, the seats being located at convenient places, which are properly elevated above the surface of the ground. These arms 18' are further supported, intermediate their ends, from the rear ends of the side bars 10, of the main frame, by the suspending straps 10'.

What is claimed is:

1. In a plant setting machine, a frame, a horizontal yoke suspended below the frame, furrow opening means on the yoke, vertical spring arms mounted on the arms of the yoke, horizontally disposed yokes mounted on the upper ends of the spring arms, upwardly directed members disposed between and carried by the horizontal yokes and diverging upwardly with respect to each other, rollers supported by the upper and lower ends of the diverging members, and endless belts engaged around said rollers.

2. In a plant setting machine, a frame, a horizontal flat yoke suspended below the frame and having furrow opening means on its lower face, vertical parallel spring arms secured to the upper face of the said yoke and rising from points adjacent the sides thereof, horizontal angular yokes having their bights secured to the upper ends of the spring arms and their arms directed inwardly, spaced and upwardly diverging channel members disposed between and having their side flanges secured to the arms of the horizontal yokes, the side flanges of the channel members being extended beyond the ends of the members and formed with bearings, rollers having their ends rotatably supported in the said bearings, and endless belts engaged around the rollers of each channel member with their inner laps respectively engaging the opposing faces of said diverging channel members.

In testimony whereof, I affix signature, in the presence of two witnesses.

BUD W. BOON.

Witnesses:
JNO. B. CROWNOVER,
M. G. CHRISTY.